United States Patent
Kim et al.

(10) Patent No.: US 12,153,604 B2
(45) Date of Patent: Nov. 26, 2024

(54) APPARATUS AND METHOD FOR GENERATING DATA SET

(71) Applicant: ELECTRONICS AND TELECOMMUNICATIONS RESEARCH INSTITUTE, Daejeon (KR)

(72) Inventors: Hyun-Jin Kim, Daejeon (KR); Jong-Hoon Lee, Daejeon (KR); Young-Soo Kim, Sejong-si (KR); Jong-Geun Park, Sejong-si (KR); Cheol-Hee Park, Gongju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 17/967,999

(22) Filed: Oct. 18, 2022

(65) Prior Publication Data
US 2023/0123045 A1    Apr. 20, 2023

(30) Foreign Application Priority Data
Oct. 19, 2021    (KR) .......................... 10-2021-0139656

(51) Int. Cl.
| G06F 16/00 | (2019.01) |
| G06F 16/28 | (2019.01) |
| G06N 3/088 | (2023.01) |

(52) U.S. Cl.
CPC ............ G06F 16/285 (2019.01); G06N 3/088 (2013.01)

(58) Field of Classification Search
None
See application file for complete search history.

(56) References Cited

U.S. PATENT DOCUMENTS

| 2018/0075357 | A1* | 3/2018 | Subramanian ......... G06N 20/00 |
| 2018/0191761 | A1 | 7/2018 | Lee et al. |
| 2019/0138749 | A1 | 5/2019 | Kim et al. |
| 2020/0387810 | A1 | 12/2020 | Hodgson et al. |
| 2021/0333906 | A1 | 10/2021 | Noh et al. |

(Continued)

FOREIGN PATENT DOCUMENTS

| KR | 1020180080449 A | 7/2018 |
| KR | 10-2020-0068050 A | 6/2020 |
| KR | 10-2128008 B1 | 6/2020 |

(Continued)

OTHER PUBLICATIONS

Jason Brownlee, "How to Choose a Feature Selection Method For Machine Learning". Machine Learning Mastery. Aug. 20, 2020.

*Primary Examiner* — Anhtai V Tran
(74) *Attorney, Agent, or Firm* — Rabin & Berdo, P.C.

(57) ABSTRACT

Disclosed herein are an apparatus and method for generating a data set. The apparatus includes one or more processors and executable memory for storing at least one program executed by the one or more processors. The at least one program classifies collected data into numerical feature data and categorical feature data using a filter method, performs correlation analysis on the numerical feature data and the categorical feature data using an analysis of variance (ANOVA) method and a Chi-Squared method, and generates a data set for supervised learning and a data set for unsupervised learning using correlation scores calculated through correlation analysis.

4 Claims, 8 Drawing Sheets

(56) References Cited

U.S. PATENT DOCUMENTS

2022/0179955 A1  6/2022  Yi et al.
2022/0237208 A1* 7/2022  Srinivasan .............. G06F 16/26

FOREIGN PATENT DOCUMENTS

| KR | 102247179 B1 | 5/2021 |
| KR | 102247181 B1 | 5/2021 |
| KR | 1020210094810 A | 7/2021 |
| KR | 10-2302484 B1 | 9/2021 |

* cited by examiner

| netflow | Start Time | Dur | Protocol | Src IP | Src Port | Dst IP | Dst Port | State | Flag |
|---|---|---|---|---|---|---|---|---|---|
| | 2021/08/01/ 09:46:53.049277 | 3550.182373 | udp | xxx.xxx.xxx.xxx | xxx | xxx.xxx.xxx.xxx | xxx | Con | 0 |
| | 2021/08/01/ 15:57:23.136895 | 0.000326 | tap | xxx.xxx.xxx.xxx | xxx | xxx.xxx.xxx.xxx | xxx | Drop | 64 |
| | sTos | dTos | Total Bytes | Src Bytes | Dst Bytes | Total Pkts | Src Pkts | Dst Pkts | Src Means | Dst Means |
| | 0 | 0 | 1494 | 1122 | 372 | 12 | 8 | 4 | 248 | 0 |
| | 0 | 0 | 1596 | 1596 | 1260 | 42 | 28 | 14 | 46 | 0 |

| syslog | Date | Times | Host Name | Process Name | Priority Level | Message |
|---|---|---|---|---|---|---|
| | 09.02 | 00:06:54 | toanybim | NetworkManger | Information | NetworkManger state is now CONNECTED |
| | 09.02 | 00:07:41 | toanybim | whoosit | debug | offline |

| btmp | User Name | Port | From | Latest |
|---|---|---|---|---|
| | User | ssh:notty | xxx.xxx.xxx.xxx | wed Sep 1 04:47 - 07:47 (00:00) |
| | test | ssh:notty | xxx.xxx.xxx.xxx | wed Sep 1 11:06 - 11:06 (00:00) |

| FW | Date | Times | Host Name | Interface | Len | Src IP | Dst IP |
|---|---|---|---|---|---|---|---|
| | 09.02 | 00:06:54 | toanybim | enp0s25 | 40 | xxx.xxx.xxx.xxx | xxx.xxx.xxx.xxx |
| | 09.02 | 00:07:41 | toanybim | enp0s25 | 60 | xxx.xxx.xxx.xxx | xxx.xxx.xxx.xxx |

| IPS | Date | Times | Scr IP | Src Port | Dst IP | Dst Port | NAT | Scr IP | Action | Dst IP | Pkts | Bytes |
|---|---|---|---|---|---|---|---|---|---|---|---|---|
| | 09.02 | 00:05:39 | xxx.xxx.xxx.xxx | xxxx | xxx.xxx.xxx.xxx | xxxx | Open | xxx.xxx.xxx.xxx | Drop | xxx.xxx.xxx.xxx | 45 | 132 |
| | 09.02 | 00:06:54 | xxx.xxx.xxx.xxx | xxxx | xxx.xxx.xxx.xxx | xxxx | Close | xxx.xxx.xxx.xxx | Drop | xxx.xxx.xxx.xxx | 23 | 52 |

FIG. 2

| | dur | Total_Pkts | Src_Pkts | Dst_Pkts | Src_Bytes | Dst_Bytes | Src_Means | Dst_Means | proto | service_itp | service_ssh | service_http.1 |
|---|---|---|---|---|---|---|---|---|---|---|---|---|
| 0 | -0.434913 | -0.096341 | -0.098884 | -0.067129 | -0.059384 | -0.049472 | 0.390377 | -0.39815 | tcp | 00 | 00 | 00 |
| 1 | -0.434913 | -0.096341 | -0.098884 | -0.067129 | -0.054982 | -0.049472 | 3.165133 | -0.39815 | tcp | 00 | 00 | 00 |
| 2 | -0.434913 | -0.096341 | -0.098884 | -0.067129 | -0.057395 | -0.049472 | 1.644058 | -0.39815 | tcp | 00 | 00 | 00 |
| 3 | -0.434913 | -0.096341 | -0.098884 | -0.067129 | -0.057979 | -0.049472 | 1.275844 | -0.39815 | tcp | 10 | 00 | 00 |
| 4 | -0.434913 | -0.096341 | -0.098884 | -0.067129 | -0.053717 | -0.049472 | 3.962930 | -0.39815 | tcp | [Supervised_Learnung.csv] | | |

FIG. 5

| | Total_Bytes | Len | service_None | service_smtp | service_dns | state_FIN |
|---|---|---|---|---|---|---|
| 0 | -0.072369 | 0.744080 | 1 | 0.0 | 0.0 | 1 |
| 1 | -0.070590 | -1.343942 | 1 | 0.0 | 0.0 | 1 |
| 2 | -0.071840 | 0.744080 | 0 | 0.0 | 0.0 | 1 |
| 3 | -0.072142 | 0.744080 | 1 | 0.0 | 0.0 | 1 |
| 4 | -0.059935 | 0.744080 | 1 | 0.0 | 0.0 | 1 |

| | state_INT | priorityLevel_Crleical | priorityLevel_Error | priorityLevel_Debug | Action_Forward | |
|---|---|---|---|---|---|---|
| 0 | 0.0 | 0.0 | 0.0 | 0.0 | 0.0 | |
| 1 | 0.0 | 0.0 | 0.0 | 0.0 | 1.0 | |
| 2 | 0.0 | 0.0 | 0.0 | 0.0 | 0.0 | |
| 3 | 0.0 | 0.0 | 0.0 | 0.0 | 1.0 | |
| 4 | 0.0 | 0.0 | 0.0 | 0.0 | 0.0 | [Unsupervised_Learning.csv] |

FIG. 6

APPARATUS AND METHOD FOR GENERATING DATA SET

CROSS REFERENCE TO RELATED APPLICATION

This application claims the benefit of Korean Patent Application No. 10-2021-0139656, filed Oct. 19, 2021, which is hereby incorporated by reference in its entirety into this application.

BACKGROUND OF THE INVENTION

1. Technical Field

The present invention relates generally to technology for processing a data set, and more particularly to technology for generating a data set for AI learning.

2. Description of the Related Art

The number of cyberattacks is exponentially increasing. Also, attack methods continue to evolve in a complicated and unpredictable manner as methods used for cyberattacks become advanced and sophisticated. However, existing manual analysis methods in which controllers analyze and detect security threats in order to respond to targeted cyberattacks and cyberthreats are only able to protect from known threats. Also, because signature and rule-based analysis methods, which are representative examples of conventional analysis methods, are also dependent on a detection rate for previously identified attacks, it is difficult to prevent and proactively respond to a new large-scale intelligent security threat.

In order to detect advanced cyberattacks, it is necessary to accurately and quickly analyze the exponentially increasing amount of data with a limited time and resources available, and a detection method using artificial intelligence (AI) and machine learning is essential. These days, a number of studies for predicting cyberthreats by analyzing and detecting major changes in data or IT infrastructure using AI and machine-learning technology is underway in an intelligent security field in order to detect cyberattacks. As representative examples thereof, research on a supervised-learning-based threat detection model, which is trained using data that is collected and classified depending on whether data corresponds to an attack, and research on an unsupervised-learning-based threat detection model, which is trained based on patterns detected in unclassified data, are underway. In the process of training such an AI-based model, feature selection may prevent overfitting by excluding unnecessary features irrelevant to the output data of the model and maintaining important information in raw data. Also, because it is able to reduce time, computing power, and the amount of memory consumed for training and to improve performance of the model, data feature selection is regarded as a very important part in the field of security threat detection.

Meanwhile, Korean Patent Application Publication No. 10-2020-0068050, titled "Apparatus and method for generating learning data for Artificial Intelligence performance", discloses an apparatus and method for generating learning data for AI performance, which may improve learning performance by avoiding a redundant data augmentation task and securing sufficient server resources.

SUMMARY OF THE INVENTION

An object of the present invention is to analyze the correlation between features depending on a data type by using various types of data sets and to generate an integrated data set for training AI models according to supervised/unsupervised learning based on correlation scores.

Another object of the present invention is to integrate multiple data sets collected from a system and network security devices into a unified data set in the process of preprocessing a data set for training a model, thereby reducing the time consumed for repeated learning of each data set.

A further object of the present invention is to use different feature extraction methods depending on a learning type when extracting features from a data set, thereby improving efficiency of training of a neural network.

Yet another object of the present invention is to generate a neural network model for cyber breach threat detection based on an integrated data set generated by selectively extracting features from a large amount of data.

Still another object of the present invention is to build security intelligence for analyzing sophisticated threats based on supervised/unsupervised learning and to apply the same in a security control solution field in which AI is to be applied.

In order to accomplish the above objects, an apparatus for generating a data set according to an embodiment of the present invention includes one or more processors and executable memory for storing at least one program executed by the one or more processors. The at least one program classifies collected data into numerical feature data and categorical feature data using a filter method, performs correlation analysis on the numerical feature data and the categorical feature data using an analysis of variance (ANOVA) method and a Chi-Squared method, and generates a data set for supervised learning and a data set for unsupervised learning using correlation scores calculated through the correlation analysis.

Here, the at least one program may rank the importance of features according to predefined feature criteria using the filter method and measure the correlation between data features based on the ranked importance of the features, thereby classifying the collected data into the numerical feature data and the categorical feature data.

Here, the at least one program may normalize the numerical feature data using a min-max scaling method and convert the categorical feature data into numerical values using a one-hot encoding method.

Here, the at least one program may determine that data corresponds to the data set for supervised learning as a correlation score calculated using the ANOVA method is higher and as a correlation score calculated using the Chi-Squared method is lower.

Here, the at least one program may determine that data corresponds to the data set for unsupervised learning as the correlation score calculated using the ANOVA method is lower and as the correlation score calculated using the Chi-Squared method is higher.

Also, in order to accomplish the above objects, a method for generating a data set, performed by an apparatus for generating a data set, according to an embodiment of the present invention includes classifying collected data into numerical feature data and categorical feature data using a filter method, performing correlation analysis on the numerical feature data and the categorical feature data using an analysis of variance (ANOVA) method and a Chi-Squared method, and generating a data set for supervised learning and a data set for unsupervised learning using correlation scores calculated through the correlation analysis.

Here, classifying the collected data may comprise ranking the importance of features according to predefined feature criteria using the filter method and measuring the correlation between data features based on the ranked importance of the features, thereby classifying the collected data into the numerical feature data and the categorical feature data.

Here, performing the correlation analysis may comprise normalizing the numerical feature data using a min-max scaling method and converting the categorical feature data into numerical values using a one-hot encoding method.

Here, performing the correlation analysis may comprise determining that data corresponds to the data set for supervised learning as a correlation score calculated using the ANOVA method is higher and as a correlation score calculated using the Chi-Squared method is lower.

Here, performing the correlation analysis may comprise determining that data corresponds to the data set for unsupervised learning as the correlation score calculated using the ANOVA method is lower and as the correlation score calculated using the Chi-Squared method is higher.

BRIEF DESCRIPTION OF THE DRAWINGS

The above and other objects, features, and advantages of the present invention will be more clearly understood from the following detailed description taken in conjunction with the accompanying drawings, in which:

FIG. 2 is a view illustrating collected data stored in a DB according to an embodiment of the present invention;

FIG. 5 and FIG. 6 are views illustrating a data set structure for cyber breach threat detection for each learning type;

DESCRIPTION OF THE PREFERRED EMBODIMENTS

Figure 1:
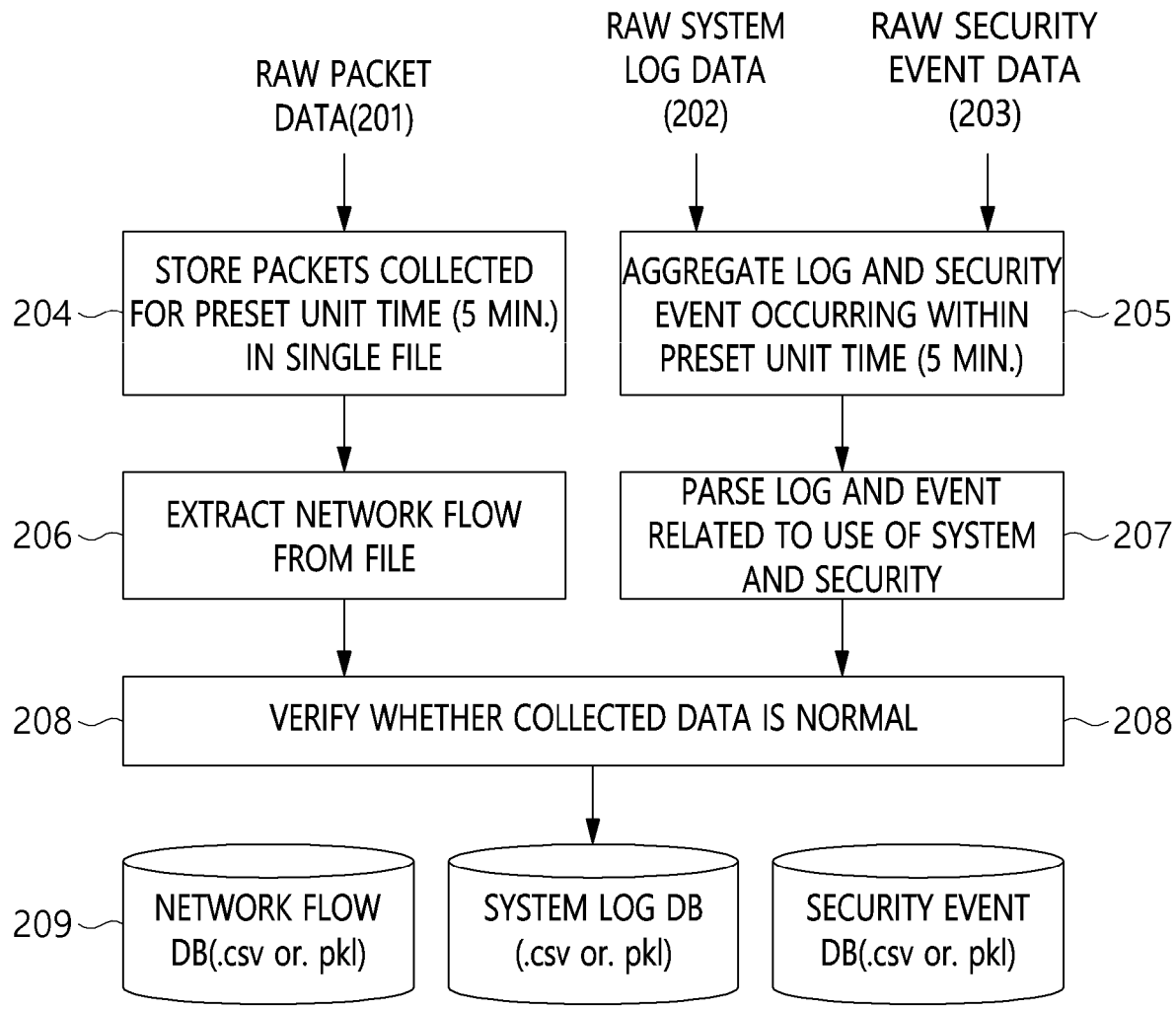
FIG. 1 is a view illustrating a process of collecting training data for an AI model for detecting cyber breach threats according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a view illustrating a process of collecting training data for an AI model for detecting cyber breach threats according to an embodiment of the present invention.

Referring to FIG. 1, it can be seen that a process of collecting network traffic, system logs, and security events to be used for training of an AI model for detecting cyber breach threats is illustrated.

The apparatus and method for generating a data set according to an embodiment of the present invention may perform the process of collecting network traffic, system logs, and security events.

Training data may include network traffic, system logs, and security events.

First, using raw packet data 201, packet data collected for a preset time period (five minutes) is saved as a single file in a pcap format (204), and a network flow may be extracted therefrom (206).

At the same time, using raw system log data 202 and raw security event data 203, data generated for a preset time period (five minutes) is aggregated (205), and logs and security events, including information about the use of the system and login failure information, may be parsed (207). Then, each line of data is read, and the configuration value of the data in each line is checked, whereby whether the line is normal data may be checked (208).

In the case of the network flow, it may be determined that data is abnormal when any one of a transmission start time, transmission duration, a protocol, a source IP address, a source port, a destination IP address, a destination port, a state, a flag, a source type of service, a destination type of service, the total number of bytes, the number of transmitted bytes, the number of received bytes, the total number of packets, the number of transmitted packets, the number of received packets, a mean of transmitted packet sizes, and a mean of received packet sizes is omitted.

In the case of the system log, it may be determined that data is abnormal when any one of a date, a time, a host name, a process name, a priority level, and a message is omitted from syslog or when any one of a user name, a user port, a source IP address, and the latest access time is omitted from btmp.

In the case of the security event, it may be determined that data is abnormal when any one of a date, a time, a host name, an interface, a length, a source IP address, and a destination IP address is omitted from firewall data or when any one of a date, a time, a source IP address, a source port, a destination IP address, a destination port, an NAT type, an action, the total number of packets, and the total number of bytes is omitted from IPS data.

When it is confirmed that the data is normal data in the user checking step, this process may be skipped.

When it is determined that the data is normal data in the above process, the respective types of data may be stored in a DB (209) as data in .csv and .pkl formats.

FIG. 2 is a view illustrating collected data stored in a DB according to an embodiment of the present invention.

Referring to FIG. 2, the network flow, the system log, and the security event data stored in respective DBs may be saved as datenetflow.csv, date-syslog.csv, date-btmp.csv, date-fw.csv, and date-ips.csv.

The respective types of data stored through the above process may be used for the process of analyzing the correlation between features after a process of cleaning a data set is performed.

Figure 3:
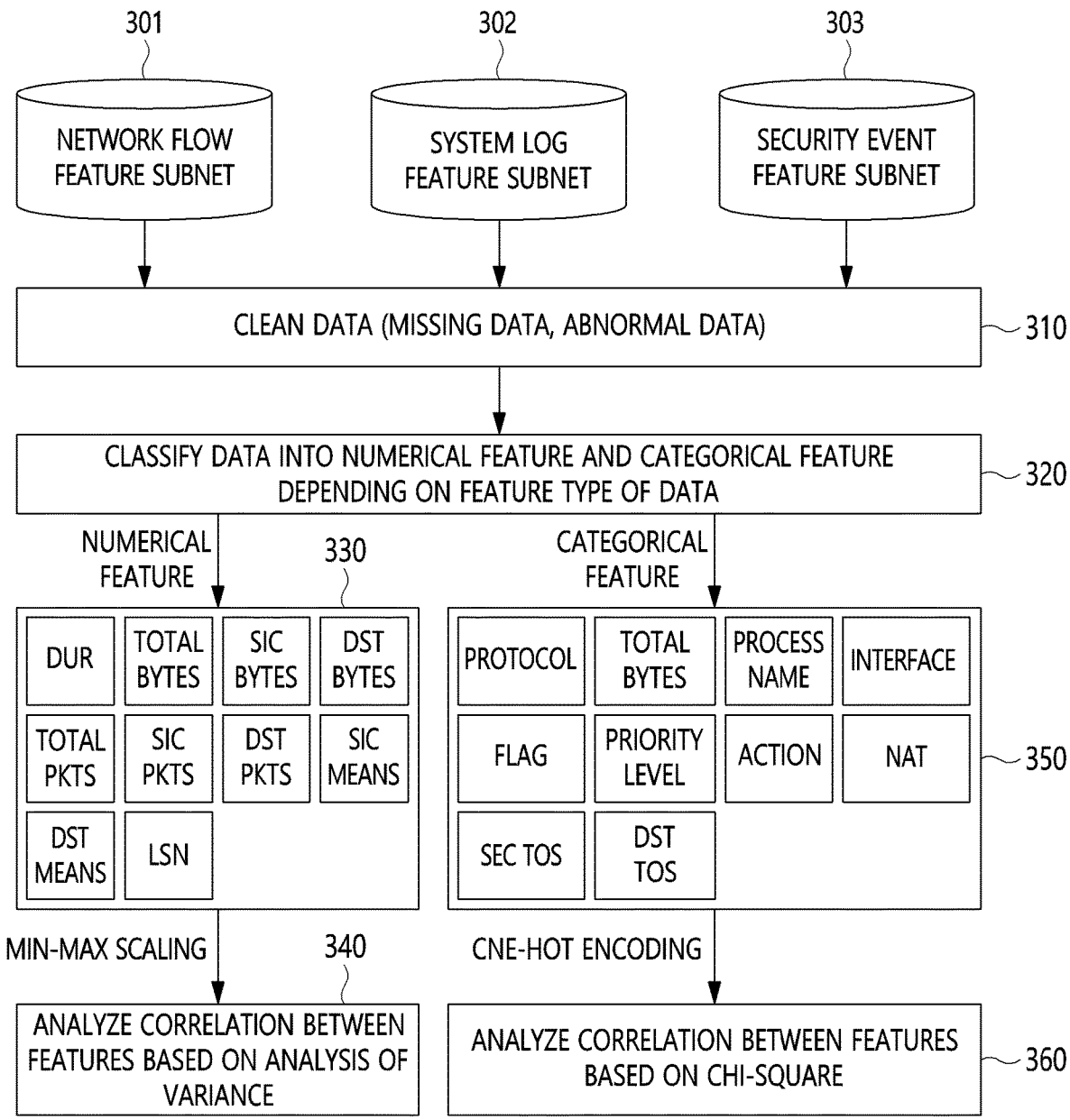
FIG. 3 is a view illustrating a data set generation process according to an embodiment of the present invention.

FIG. 3 is a view illustrating a process of generating a data set according to an embodiment of the present invention.

Referring to FIG. 3, it can be seen that a process of cleaning data and a process of analyzing the correlation between features are illustrated.

The apparatus and method for generating a data set according to an embodiment of the present invention may generate a data feature subset, predict missing data, which is determined not to have a required value, using another feature in the same data set, and insert the predicted data using imputation and regression imputation techniques.

Subsequently, data out of the range between a preset upper standard deviation and a preset lower standard deviation, e.g., three standard deviations from the mean, is determined to be an outlier for each data feature, and data including the outlier may be deleted. The cleaned data is sorted by features in order to extract meaningful features required for learning, and correlation analysis may be performed on each feature.

In the present invention, network traffic, system logs, and security event data configured with numerical data and categorical data may be used as training data, and categorical data indicating whether a security threat is present may be output.

In the present invention, feature extraction may be performed based on a filter method, which calculates feature importance rankings based on statistical measurement criteria, in order to classify features included in the data into numerical features and categorical features.

The filter method may rank the importance of the features according to feature criteria and measure the correlation between the data features while filtering out features having low rankings.

In the present invention, data is collected using a method of collecting network traffic, specific system logs, and security events for learning in order to generate an AI model, and features are extracted from the collected data for each learning type, whereby a data set may be generated.

Here, the numerical features may be normalized so as to have values ranging from 0 to 1 using a min-max scaling method, and the categorical features may be converted into one-hot vectors in the form of numerical values by performing one-hot encoding in order to calculate a correlation.

Then, in order to perform correlation analysis for each data feature, correlation analysis based on Analysis of Variance (ANOVA) may be used for numerical input data and numerical output data, and correlation analysis based on a Chi-Squared method may be used for categorical input data and categorical output data.

$$F = \frac{\sum N_j(\overline{X}_j - \overline{X})^2/(k-1)}{\sum\sum\{(X - \overline{X}_j)^2/(N-k)\}} \quad (1)$$

$$X^2 = \sum_{i=1}^{k} \frac{(O_i - E_i)^2}{E_i} \quad (2)$$

Equation (1) is an equation for analyzing the correlation between numerical data features.

In Equation (1), $N_1$ denotes the coefficient of a feature of a group j, $X_j$ denotes a feature of data in the group j, X denotes the mean of features, and k denotes the number of data groups.

The numerical features in data to which analysis of variance (ANOVA) using Equation (1) is applied include transmission duration, source and destination types of service, the total number of bytes, the numbers of transmitted/received bytes, the total number of packets, the numbers of transmitted/received packets, a mean of transmitted/received packet sizes, and a length.

Correlation analysis based on ANOVA is an analysis method for checking the difference in means of numerical data, and the correlation of data may be calculated based on F-Test, which calculates the difference in means between groups by calculating a variance by dividing the sum of squares of deviations, each of which is the difference between a numerical data value and the mean of data, by a sample size.

Equation (2) is an equation for analyzing the correlation between categorical data features.

In Equation (2), $O_i$ denotes the observed frequency of a feature, $E_i$ denotes the expected value for the observed frequency of the feature i, and k denotes the number of categories.

The categorical features in data to which Chi-Squared analysis is applied include a protocol, a state, a process name, a flag, a priority level, an action, an interface, and an NAT type.

Correlation analysis based on a Chi-Squared method is configured to calculate whether the probability of the distribution of a feature in the categorical data is the same as the probability of the distribution of another feature by comparing the mean value of the observed frequency and to represent information about whether correlation is present as a number, thereby calculating the correlation of the data.

In analysis of variance, as the value of F increases, a deviation increases, because the variation between groups becomes greater than the variation within a group. That is, it means that the correlation between features decreases as the value of F increases.

In Chi-Squared analysis, as the value of $X^2$ increases, the difference between the observed frequency of a feature and the expected value thereof increases. That is, it means that the correlation increases as the value of $X^2$ increases.

As described above, the present invention may apply different feature selection methods depending on whether a method of training an AI model is supervised learning or unsupervised learning before an integrated data set is generated based on a correlation analysis method.

$$Correlation_{Supervised}(x_i) = \begin{cases} \dfrac{F_i}{\sum_{i=1}^{n} F_i} \times 100 & \text{(NUMERICAL FEATURE)} \\ 1 - \dfrac{X_i^2}{\sum_{i=1}^{n} X_i^2} & \text{(CATEGORICAL FEATURE)} \end{cases} \quad (3)$$

Equation (3) is an equation for calculating a correlation score when a model is trained using supervised learning.

In the case of supervised learning, training may be performed based on the relationship between an independent variable, which is input data, and a dependent variable, which is output data.

Accordingly, features having a high correlation therebetween due to dependence between the features of data are selected and learned, and features may be selected in descending order of correlation score.

That is, the data correlation score for supervised learning may be calculated to be proportional to the value of F in the case of numerical features and to be inversely proportional to the value of $X^2$ in the case of categorical features.

$$\text{Correlation}_{Unsupervised}(x_i) = \begin{cases} 1 - \dfrac{F_i}{\sum_{i=1}^{n} F_i} & \text{(NUMERICAL FEATURE)} \\ \dfrac{X_i^2}{\sum_{i=1}^{n} X_i^2} \times 100 & \text{(CATEGORICAL FEATURE)} \end{cases} \quad (4)$$

Equation (4) is an equation for calculating a correlation score when a model is trained using unsupervised learning.

Unlike supervised learning, unsupervised learning is aimed to extract features of data regardless of the relationship between an independent variable and a dependent variable, so features may be selected in ascending order of correlation score between features in order to minimize the effects of the correlation in the training process.

As opposed to supervised learning, the unsupervised learning is the data correlation score may be calculated to be inversely proportional to the value of F in the case of numerical features and to be proportional to the value of $X^2$ in the case of categorical features, thereby being calculated using n, which are the numbers of features.

Figure 4:
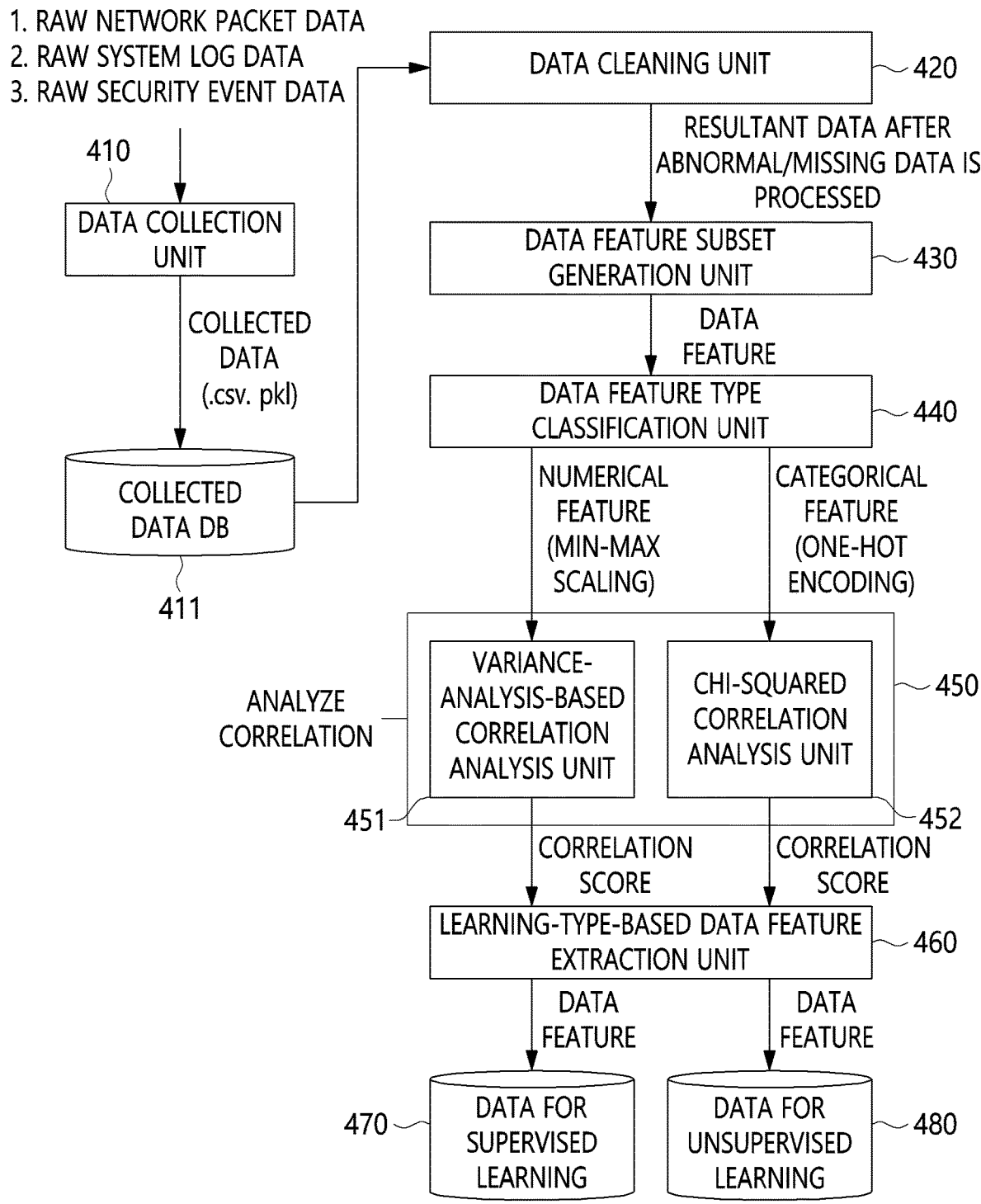
FIG. 4 is a block diagram illustrating an apparatus for generating a data set according to an embodiment of the present invention.

FIG. 4 is a block diagram illustrating an apparatus for generating a data set according to an embodiment of the present invention.

Referring to FIG. 4, the apparatus for generating a data set according to an embodiment of the present invention may include a data collection unit 410, a collected data DB 411, a data cleaning unit 420, a data feature subset generation unit 430, a data feature type classification unit 440, a correlation analysis unit 450, a feature extraction unit 460, a supervised-learning data DB 470, and an unsupervised-learning data DB 480.

First, the data collection unit 410 may collect raw data in order to extract data features.

The raw data may include raw network packet data, raw system log data, and raw security event data.

Here, the data collection unit 410 may collect data using the data collection process described with reference to FIG. 1, verify whether the collected data is normal, and store data in the formats of .csv and .pkl in the collected data DB.

The data cleaning unit 420 may check features of data and process missing data using imputation and regression imputation methods.

Here, the data cleaning unit 420 performs outlier processing by which data out of the range between an upper standard deviation and a lower standard deviation, which are preset to three standard deviations from the mean, is deleted, thereby cleaning the data.

The data feature subset generation unit 430 may generate a data feature subset from the cleaned data.

The data feature type classification unit 440 may classify data acquired from the data feature subset into numerical feature data and categorical feature data.

Here, in order to classify features included in data into numerical features and categorical features, the data feature type classification unit 440 may classify data by extracting features based on a filter method, which ranks the importance of features based on statistical measurement criteria.

The correlation analysis unit 450 may perform correlation analysis on the numerical feature data and the categorical feature data.

Here, the correlation analysis unit 450 may include an variance-analysis-based correlation analysis unit 451 and a Chi-Squared correlation analysis unit 452.

Here, the variance-analysis-based correlation analysis unit 451 may perform correlation analysis on the numerical data based on an ANOVA method after min-max scaling of the numerical data.

Here, the Chi-Squared correlation analysis unit 452 may perform correlation analysis on the categorical data based on a Chi-Squared method after one-hot encoding thereof.

Here, the correlation analysis unit 450 may calculate a correlation score using the correlation value calculated through correlation analysis depending on whether the learning type is supervised learning or unsupervised learning.

Here, the correlation analysis unit 450 may use a correlation calculation equation configured to determine a feature to be a useful feature as the variance analysis value F is larger and the Chi-Squared analysis value $X^2$ is smaller when the correlation between features is analyzed for supervised learning.

Here, the correlation analysis unit 450 may use a correlation calculation equation configured to determine a feature to be a useful feature as the variance analysis value F is smaller and a Chi-Squared analysis value $X^2$ is larger when the correlation between features is analyzed for unsupervised learning.

The feature extraction unit 460 may generate a data set for supervised learning and a data set for unsupervised learning using the values calculated using the correlation calculation equations.

Here, the feature extraction unit 460 may store the data set for supervised learning in the supervised-learning data DB 470, and may store the data set for unsupervised learning in the unsupervised-learning data DB 480.

FIG. 5 and FIG. 6 are views illustrating the structure of a data set for detecting a cyber breach threat for each learning type.

Referring to FIG. 5 and FIG. 6, high-ranked features selected based on calculated correlation scores are separately stored as a data set for supervised learning and a data set for unsupervised learning depending on whether the learning type is supervised learning or unsupervised learning.

Figure 7:
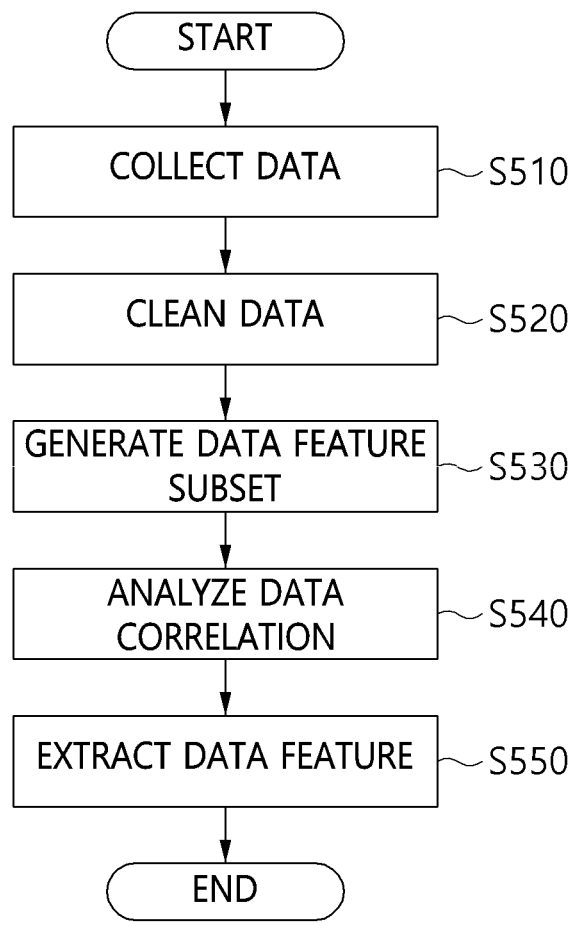
FIG. 7 is a flowchart illustrating a method for generating a data set according to an embodiment of the present invention.

FIG. 7 is a flowchart illustrating a method for generating a data set according to an embodiment of the present invention.

Referring to FIG. 7, in the method for generating a data set according to an embodiment of the present invention, first, data may be collected at step S510.

That is, at step S510, raw data from which data features are to be extracted may be collected.

The raw data may include raw network packet data, raw system log data, and raw security event data.

Here, at step S510, data may be collected using the data collection process described with reference to FIG. 1, whether the collected data is normal may be verified, and data in the formats of .csv and .pkl may be stored in a collected data DB.

Also, in the method for generating a data set according to an embodiment of the present invention, data may be cleaned at step S520.

That is, at step S520, features of the data are checked, and missing data may be processed using imputation and regression imputation methods.

Here, at step S520, outlier processing by which data out of the range between an upper standard deviation and a lower standard deviation, which are preset to three standard deviations from the mean, is performed, whereby the data may be cleaned.

Also, in the method for generating a data set according to an embodiment of the present invention, a data feature subset may be generated at step S530.

That is, at step S530, a data feature subset may be generated from the cleaned data.

Here, at step S530, data acquired from the data feature subset may be classified into numerical feature data and categorical feature data.

Also, in the method for generating a data set according to an embodiment of the present invention, data correlation analysis may be performed at step S540.

That is, at step S540, correlation analysis may be performed on the numerical feature data and the categorical feature data.

Here, at step S540, correlation analysis based on an analysis of variance (ANOVA) method may be performed on the numerical feature data after min-max scaling.

Here, at step S540, correlation analysis based on a Chi-Squared method may be performed on the categorical feature data after one-hot encoding.

Here, at step S540, using the correlation value calculated through correlation analysis, correlation scores may be calculated depending on whether the learning type is supervised learning or unsupervised learning.

Here, at step S540, when the correlation between features is analyzed for supervised learning, a correlation calculation equation, based on which a feature is determined to be more useful as the variance analysis value F is greater and as the Chi-Squared value $X^2$ is smaller, may be used.

Here, at step S540, when the correlation between features is analyzed for unsupervised learning, a correlation calculation equation, based on which a feature is determined to be more useful as the variance analysis value F is smaller and as the Chi-Squared value $X^2$ is greater, may be used.

Also, in the method for generating a data set according to an embodiment of the present invention, data features may be extracted, and a data set may be generated at step S550.

That is, at step S550, a data set for supervised learning and a data set for unsupervised learning may be generated using the values calculated using the correlation calculation equation.

Here, at step S550, the data set for supervised learning may be stored in a supervised-learning data DB, and the data set for unsupervised learning may be stored in an unsupervised-learning data DB.

Figure 8:
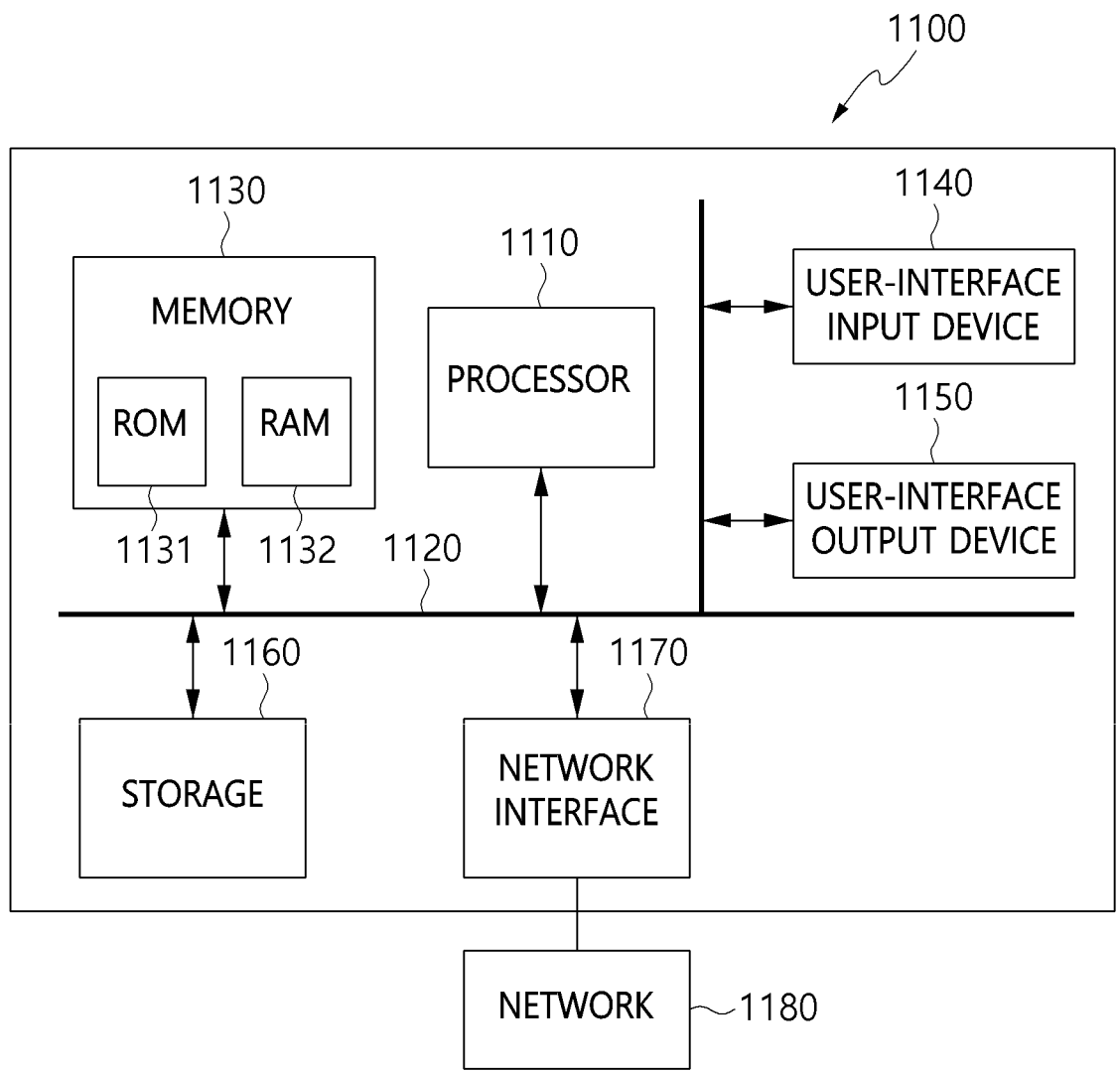
FIG. 8 is a view illustrating a computer system according to an embodiment of the present invention.

FIG. 8 is a view illustrating a computer system according to an embodiment of the present invention.

Referring to FIG. 8, the apparatus for generating a data set according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for generating a data set according to an embodiment of the present invention includes one or more processors 1110 and executable memory 1130 for storing at least one program executed by the one or more processors 1110. The at least one program classifies collected data into numerical feature data and categorical feature data using a filter method, performs correlation analysis on the numerical feature data and the categorical feature data using an analysis of variance (ANOVA) method and a Chi-Squared method, and generates a data set for supervised learning and a data set for unsupervised learning using correlation scores calculated through correlation analysis.

Here, the at least one program ranks the importance of features according to predefined feature criteria using the filter method and measures the correlation between the data features based on the ranked importance of the features, thereby classifying the data into the numerical feature data and the categorical feature data.

Here, the at least one program may normalize the numerical feature data using a min-max scaling method, and may convert the categorical feature data into numerical values using a one-hot encoding method.

Here, the at least one program may determine that data corresponds to the data set for supervised learning as the correlation score calculated using the ANOVA method is higher and as the correlation score calculated using the Chi-Squared method is lower.

Here, the at least one program may determine that data corresponds to the data set for unsupervised learning as the correlation score calculated using the ANOVA method is lower and as the correlation score calculated using the Chi-Squared method is higher.

According to the present invention, the correlation between features may be analyzed depending on a data type by using various types of data sets, and an integrated data set for training AI models according to supervised/unsupervised learning may be generated based on correlation scores.

Also, the present invention may reduce the time consumed for repeated learning of each data set by integrating multiple data sets collected from a system and network security devices into a unified data set in the process of preprocessing a data set for training a model.

Also, the present invention may improve efficiency of training of a neural network by using different extraction methods depending on a learning type when extracting features from a data set.

Also, the present invention may generate a neural network model for cyber breach threat detection based on an integrated data set generated by selectively extracting features from a large amount of data.

Also, the present invention may build security intelligence for analyzing sophisticated threats based on supervised/unsupervised learning and apply the same in a security control solution field in which AI is to be applied.

As described above, the apparatus and method for generating a data set according to the present invention are not limitedly applied to the configurations and operations of the above-described embodiments, but all or some of the embodiments may be selectively combined and configured, so the embodiments may be modified in various ways.

What is claimed is:

1. An apparatus for generating a data set, comprising:
one or more processors; and
executable memory for storing at least one program executed by the one or more processors,
wherein the at least one program is configured to
classify collected data into numerical feature data and categorical feature data using a filter method, the collected data including network traffic data, system log data, and security event data,
perform correlation analysis on the numerical feature data and the categorical feature data using an analysis of variance (ANOVA) method and a Chi-Squared method,
generate a data set for supervised learning and a data set for unsupervised learning using correlation scores calculated through the correlation analysis, and
generate a neural network model for cyber breach threat detection based on the data set for supervised learning and a data set for unsupervised learning,
wherein the at least one program is configured to:
rank importance of features according to predefined feature criteria using the filter method and measure a correlation between data features based on the ranked importance of the features, thereby classifying the collected data into the numerical feature data and the categorical feature data,
normalize the numerical feature data using a min-max scaling method and convert the categorical feature data into numerical values using a one-hot encoding method, and
determine that data corresponds to the data set for supervised learning as a correlation score calculated using the ANOVA method is higher and a correlation score calculated using the Chi-Squared method is lower.

2. The apparatus of claim 1, wherein the at least one program determines that data corresponds to the data set for unsupervised learning as the correlation score calculated using the ANOVA method is lower and the correlation score calculated using the Chi-Squared method is higher.

3. A method for generating a data set, performed by an apparatus for generating a data set, comprising:
classifying collected data into numerical feature data and categorical feature data using a filter method, the collected data including network traffic data, system log data, and security event data;
performing correlation analysis on the numerical feature data and the categorical feature data using an analysis of variance (ANOVA) method and a Chi-Squared method;
generating a data set for supervised learning and a data set for unsupervised learning using correlation scores calculated through the correlation analysis; and
generate a neural network model for cyber breach threat detection based on the data set for supervised learning and a data set for unsupervised learning,
wherein classifying the collected data comprises ranking importance of features according to predefined feature criteria using the filter method and measuring a correlation between data features based on the ranked importance of the features, thereby classifying the collected data into the numerical feature data and the categorical feature data,
wherein performing the correlation analysis comprises:
normalizing the numerical feature data using a min-max scaling method and converting the categorical feature data into numerical values using a one-hot encoding method; and
determining that data corresponds to the data set for supervised learning as a correlation score calculated using the ANOVA method is higher and as a correlation score calculated using the Chi-Squared method is lower.

4. The method of claim 3, wherein performing the correlation analysis comprises determining that data corresponds to the data set for unsupervised learning as the correlation score calculated using the ANOVA method is lower and the correlation score calculated using the Chi-Squared method is higher.

* * * * *